United States Patent
Mukai et al.

(10) Patent No.: US 6,713,980 B2
(45) Date of Patent: Mar. 30, 2004

(54) APPARATUS AND METHOD FOR CONTROLLING MOVING MEMBER

(75) Inventors: Daisuke Mukai, Shizuoka-ken (JP); Motoya Yamamoto, Shizuoka-ken (JP); Yoshinobu Toyoda, Aichi-ken (JP)

(73) Assignee: Asmo Co., Ltd., Kosai (JP)

( * ) Notice: Subject to any disclaimer, the term of this patent is extended or adjusted under 35 U.S.C. 154(b) by 0 days.

(21) Appl. No.: 10/208,689

(22) Filed: Jul. 30, 2002

(65) Prior Publication Data
US 2003/0052634 A1 Mar. 20, 2003

(30) Foreign Application Priority Data
Jul. 30, 2001 (JP) ......................................... 2001-229223

(51) Int. Cl.$^7$ .............................. H02P 7/00; H02P 3/00; G05B 9/02
(52) U.S. Cl. ......................... 318/434; 318/566; 318/280
(58) Field of Search ................................ 318/560, 563, 318/565, 567, 603, 127, 272, 275, 277, 280–283, 364, 366, 369, 466, 469, 479, 430, 431, 434

(56) References Cited

U.S. PATENT DOCUMENTS

| | | | | |
|---|---|---|---|---|
| 4,467,250 A | * | 8/1984 | Thomasson | 318/436 |
| 5,296,788 A | * | 3/1994 | Betton et al. | 318/283 |
| 5,422,551 A | * | 6/1995 | Takeda et al. | 318/265 |
| 5,539,290 A | * | 7/1996 | Lu et al. | 318/565 |
| 5,723,960 A | * | 3/1998 | Harada | 318/469 |
| 5,774,046 A | * | 6/1998 | Ishihara et al. | 340/438 |
| 5,917,299 A | * | 6/1999 | Kumagai et al. | 318/466 |
| 6,114,820 A | * | 9/2000 | Nishigaya | 318/466 |
| 6,150,784 A | * | 11/2000 | Nagaoka | 318/467 |
| 6,531,837 B1 | * | 3/2003 | Forstl et al. | 318/139 |
| 2003/0052537 A1 | * | 3/2003 | Okada et al. | 307/10.1 |
| 2003/0052636 A1 | * | 3/2003 | Okada et al. | 318/455 |
| 2003/0122516 A1 | * | 7/2003 | Mukai et al. | 318/468 |

FOREIGN PATENT DOCUMENTS

JP          10-018709          1/1998

* cited by examiner

*Primary Examiner*—Robert Nappi
*Assistant Examiner*—Patrick Miller
(74) *Attorney, Agent, or Firm*—Colin P. Cahoon; Carstens, Yee & Cahoon, LLP

(57) ABSTRACT

A sunroof apparatus comprises a drive motor which actuates a roof glass and a control section. The control section rotates the drive motor reversely when the movement of the sunroof is obstructed by a caught foreign matter. When a drive voltage to be supplied to the drive motor becomes lower than a reference voltage, the control section determines that the drive voltage is abnormal and stops supplying the drive voltage to the drive motor to inhibit the drive motor from being operated. A first reference voltage is used as the reference voltage at the time the drive motor is stopped, and a second reference voltage lower than the first reference voltage is used as the reference voltage at the time the drive motor is operated. It is therefore possible to detect a foreign matter being caught before an abnormality of the drive voltage is determined.

11 Claims, 6 Drawing Sheets

APPARATUS AND METHOD FOR CONTROLLING MOVING MEMBER

BACKGROUND OF THE INVENTION

The present invention relates to a control apparatus and control method that control the operation of a moving member, such as the roof glass, window glass or slide door of a vehicle, which opens or closes the opening.

In an ordinary sunroof apparatus equipped on a vehicle, a roof glass which is actuated by a drive motor opens or closes an opening provided in the roof of the vehicle. This sunroof apparatus has capabilities of detecting a foreign matter being caught between the roof glass and the periphery of the opening during the closing actuation of the roof glass and reversing the moving direction of the roof glass to an opening direction from a closing direction when a foreign matter is caught there during the closing actuation of the roof glass. Specifically, a control circuit which controls the drive motor detects the rotational speed of the drive motor, and when the detected rotational speed becomes lower than a predetermined decision value, the control circuit determines that a load is applied to the drive motor due to the caught foreign matter and reverses the rotational direction of the drive motor to reverse the moving direction of the roof glass.

When the supply voltage to be supplied to the control circuit drops, the relay that drives the drive motor may not be operated due to the insufficient voltage, thereby stopping the operation of the drive motor. The threshold value of the voltage that makes such a relay inoperable varies from one relay to another. The control circuit stops the drive motor in operation or inhibits the operation of the drive motor when the supply voltage becomes lower than a predetermined reference voltage, so that the voltage value at which the drive motor becomes inoperable due to such a variation in threshold value does not vary from one sunroof apparatus to another.

The supply voltage may also drop during the operation of the drive motor. When a load is applied to the drive motor due to a foreign matter caught in the roof glass, particularly, the current to the motor increases, thus causing a relatively large drop in supply voltage.

In a case where a foreign matter having a low rigidity is caught in the roof glass, the voltage drop becomes greater. In other words, the time during which the voltage is being dropped becomes longer. Therefore, the control circuit detects a voltage abnormality as a result of the supply voltage becoming less than the reference voltage and stops the drive motor before detecting a foreign matter being caught in the roof glass based on a reduction in the rotational speed of the drive motor. As a result, the moving direction of the roof glass is not reversed to the opening direction so that the roof glass is stopped moving with a foreign matter caught in the roof glass.

SUMMARY OF THE INVENTION

Accordingly, it is an objective of the present invention to provide a control apparatus and control method for a moving member, which can reliably detect a foreign matter being caught in the moving member and can release the foreign matter.

To achieve the object, the present invention provides an apparatus that controls a moving member movable between an opening position in which an opening of a frame is opened and a closing position in which the opening of the frame is closed. The apparatus comprises a drive motor, a switch and a control section. The drive motor actuates the moving member when applied with a drive voltage. The switch is operated to actuate the moving member. The control section controls the supply of the drive voltage to the drive motor in accordance with an operation of the switch. The control section rotates the drive motor reversely to reverse the moving direction of the moving member when movement of the moving member is obstructed by a caught foreign matter while the moving member is moving toward the closing position. The control section determines that the drive voltage is abnormal based on the drive voltage becoming lower than a predetermined reference voltage. The control section inhibits the drive motor from being operated when having determined an abnormality of the drive voltage and stops supplying the drive voltage to the drive motor. The control section sets the reference voltage to a selected one of a first value and a second value lower than the first value and sets the reference voltage to the second value at least while the moving member is moving toward the closing position.

The present invention also provides a method that controls a moving member movable between an opening position in which an opening of a frame is opened and a closing position in which the opening of the frame is closed. The method comprises a step of causing the drive motor to actuate the moving member by applying a drive voltage to the drive motor, a step of rotating the drive motor reversely to reverse the moving direction of the moving member when movement of the moving member is obstructed by a caught foreign matter while the moving member is moving toward the closing position, a step of determining that the drive voltage is abnormal based on the drive voltage becoming lower than a predetermined reference voltage, a step of stopping supplying the drive voltage to the drive motor to inhibit the drive motor from being operated when an abnormality of the drive voltage has been determined, and a step of setting the reference voltage to a selected one of a first value and a second value lower than the first value. The reference voltage is set to the second value at least while the moving member is moving toward the closing position.

BRIEF DESCRIPTION OF THE DRAWINGS

The characteristics of the present invention which are believed to be novel would be readily apparent from the scope of the appended claims. The present invention, together with objects and advantages thereof, may best be understood by reference to the following description of the presently preferred embodiment together with the accompanying drawings in which:

DETAILED DESCRIPTION OF THE PREFERRED EMBODIMENT

Figure 4:
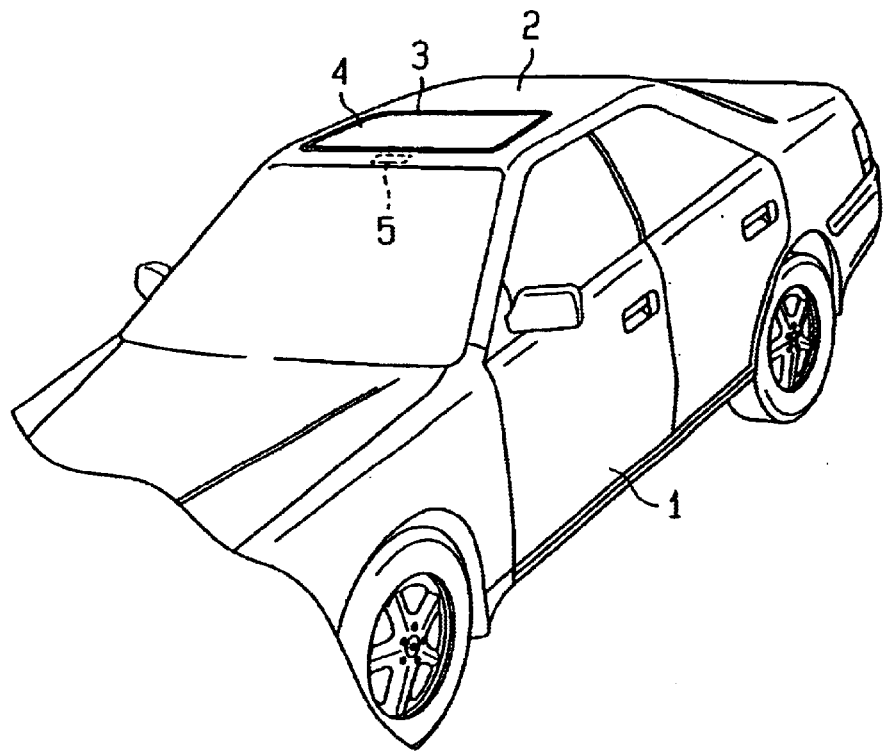
FIG. 4 is a perspective view of the essential portions of a vehicle equipped with the sunroof apparatus in FIG. 1.

One preferred embodiment of the present invention will now be described with reference to the accompanying drawings. FIG. 4 is a perspective view of the essential portions of a vehicle equipped with a sunroof apparatus. A roof glass 4 as a moving member is provided in a skylight 3 or an opening, which is formed in a roof panel 2 of a vehicle 1. The roof glass 4 is slidable back and forth along the vehicle 1 to open and close the skylight 3 and is tiltable in its front portion about the axial line extending in the widthwise direction of the vehicle 1 at the front end portion. The roof glass 4 is actuated by a drive motor 5, indicated by the broken line in FIG. 4, via an unillustrated drive transmission mechanism. The drive motor 5, together with a control circuit 11 for controlling the motor 5, constitutes a drive unit 10. The drive unit 10 is laid out in front of the skylight 3 between a roof panel 2 and the ceiling panel (not shown) in the vehicle's room.

Figure 2:
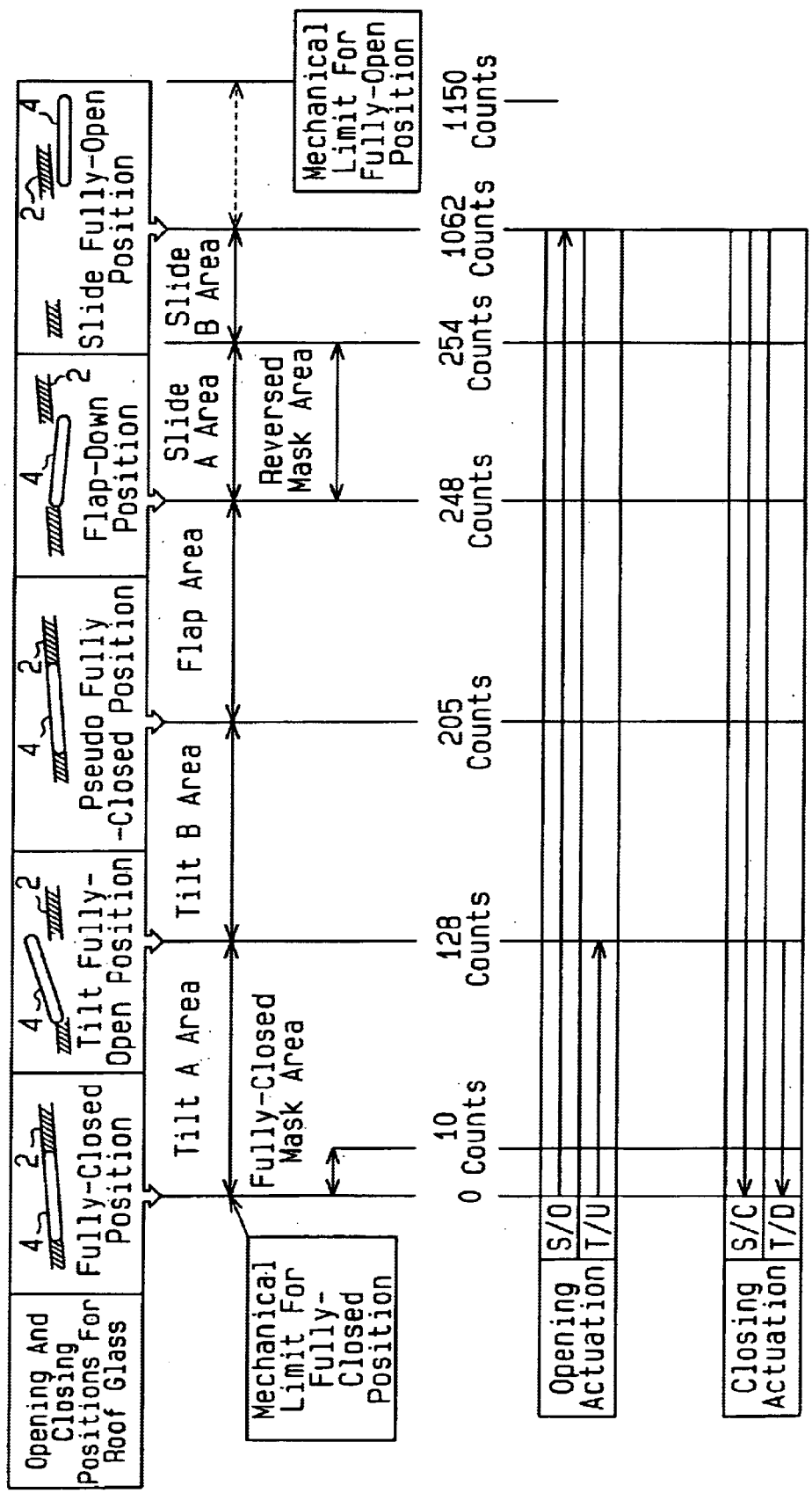
FIG. 2 is a diagram for explaining the operation of the sunroof apparatus.

As shown in FIG. 2, the roof glass 4 has a fully-closed position, a tilt fully-open position, a pseudo fully-closed position, a flap-down position and a slide fully-open position. The roof glass 4 in the fully-closed position closes the entire skylight 3. When the roof glass 4 is slid and placed in the slide fully-open position, the roof glass 4 opens the skylight 3 entirely. The tilt fully-open position is the position where the rear end of the roof glass 4 rises most outward of the room. The flap-down position is the position where the rear end of the roof glass 4 goes down most inside the room. The pseudo fully-closed position is the position where the rear end of the roof glass 4 meets the rear end of the skylight 3 during shifting to the flap-down position from the tilt fully-open position, so that the roof glass 4 is placed as if the skylight 3 were closed, and where the rear end of the roof glass 4 passes instantaneously.

In the present embodiment, the actuation of the roof glass 4 to shift from the fully-closed position and pass the tilt fully-open position, the pseudo fully-closed position, the flap-down position and the slide fully-open position in order is called "slide opening" (S/O actuation in FIG. 2) and the reverse actuation is called "slide closing" (S/C actuation in FIG. 2). The slide opening and slide closing of the roof glass 4 are carried out by respectively manipulating a slide open switch SW2 and a slide close switch SW3 both shown in FIG. 1.

The actuation of the roof glass 4 from the fully-closed position to the tilt fully-open position is called "tilt opening" (T/U actuation in FIG. 2) and the reverse actuation is called "tilt closing" (T/D actuation in FIG. 2). The tilt-opening actuation and closing actuation of the roof glass 4 are carried out by respectively manipulating a tilt open switch SW4 and a tilt close switch SW5 shown in FIG. 1.

Figure 1:
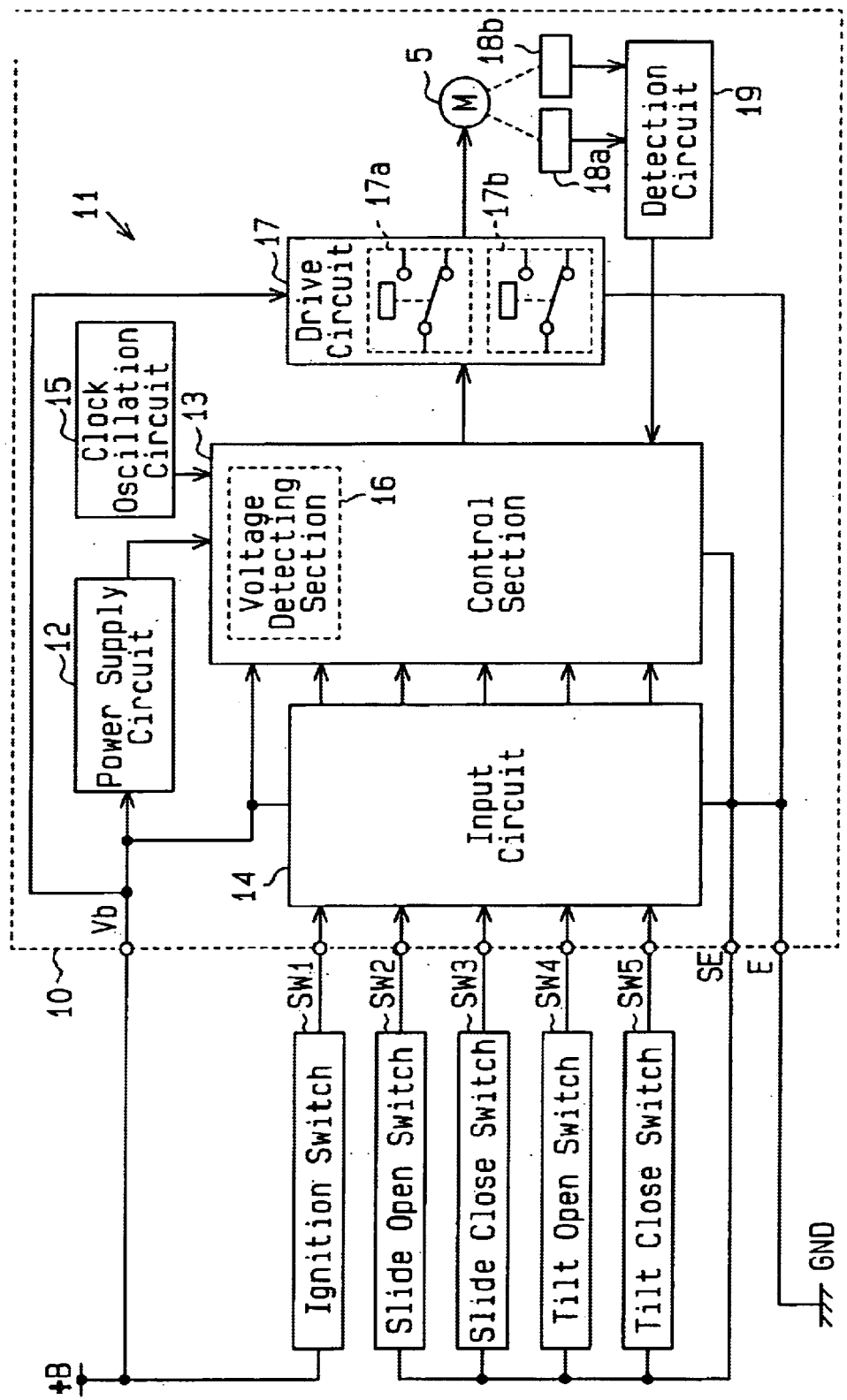
FIG. 1 is a block circuit diagram of a sunroof apparatus according to one embodiment of the present invention.

FIG. 1 is a block circuit diagram for explaining the electric structure of a sunroof apparatus. The control circuit 11 for controlling the drive motor 5 is connected to a battery (not shown) and is supplied with a drive voltage +B from the battery. The drive voltage +B (e.g., 12 V) is adjusted to a predetermined voltage in a power supply circuit 12 in the control circuit 11, which is then supplied to a control section 13.

An ignition switch SW1 is connected to the control circuit 11. The ignition switch SW1 is connected to the control section 13 via an input circuit 14 in the control circuit 11. The ignition switch SW1, when operated, outputs an operation signal (ON signal) to the control section 13 via the input circuit 14. In response to the ON signal from the ignition switch SW1, the control section 13 operates based on the drive voltage +B supplied from the power supply circuit 12.

Various switches for operating the roof glass 4, namely, the slide open switch SW2, the slide close switch SW3, the tilt open switch SW4 and the tilt close switch SW5, are connected to the control circuit 11. The switches SW2 to SW5 are connected to the control section 13 via the input circuit 14 in the control circuit 11. Each of the switches SW2 to SW5, when operated, sends an instruction signal to the control section 13 via the input circuit 14. The instruction signal in the present embodiment is an ON signal with an L level (ground level).

A reference clock signal needed for the operation of the control section 13 is input to the control section 13 from a clock oscillation circuit 15. The control section 13 has a voltage detecting section 16. The control section 13 detects a value Vb of the drive voltage +B by using the voltage detecting section 16. When a state in which the detected value Vb is a low voltage lower than a predetermined reference voltage continues for a predetermined time t (198 ms in the present embodiment) or longer, the control section 13 stops the drive motor 5 in operation or inhibits the operation of the drive motor 5. That is, the control section 13 stops supplying the drive voltage +B to the drive motor 5.

Figure 3:
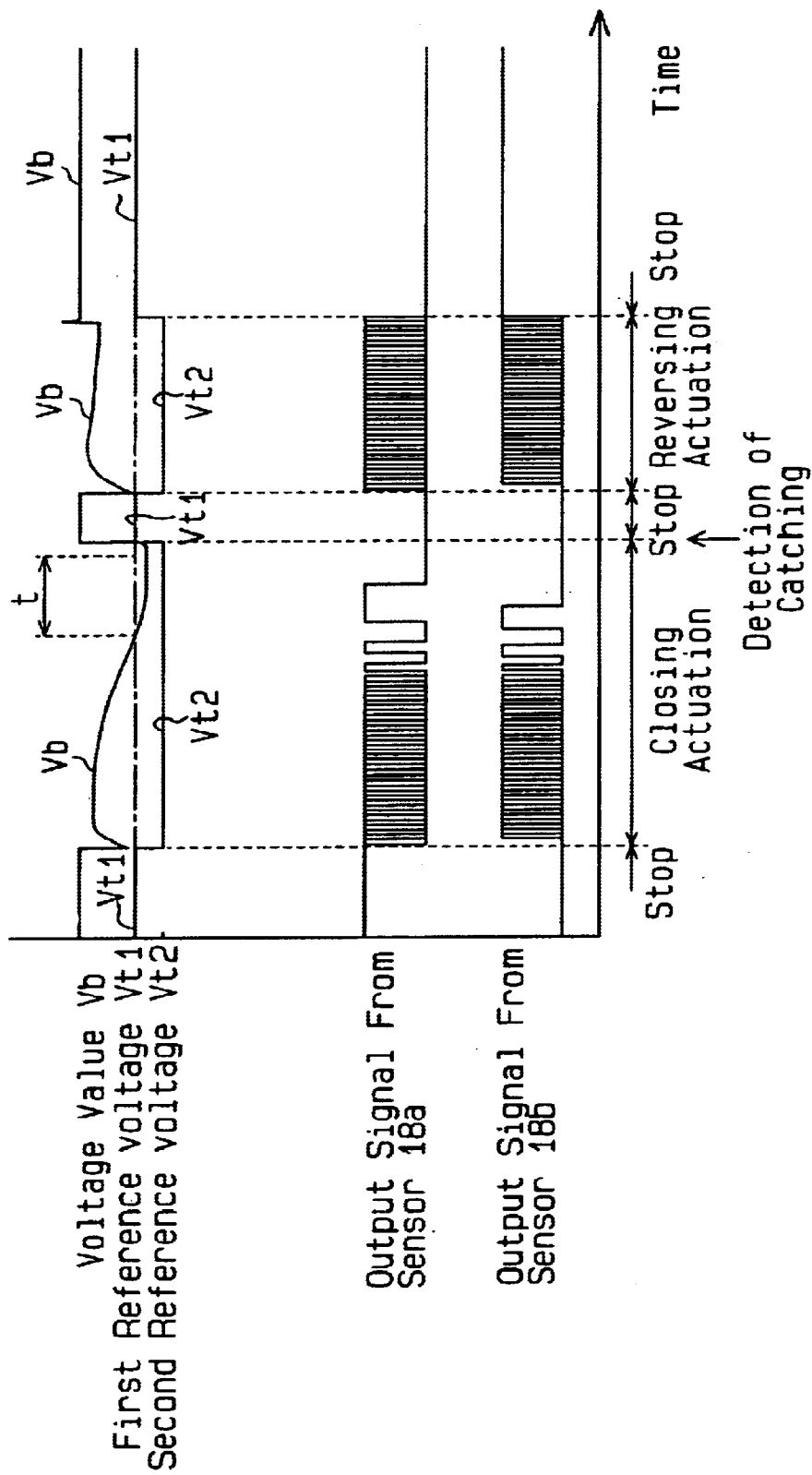
FIG. 3 is a timing chart for explaining a foreign-matter catching detecting operation.

When the drive motor 5 is stopped, as shown in FIG. 3, the reference voltage is set to a first reference voltage Vt1 (8 V in the present embodiment) which is needed to operate first and second relays 17a and 17b for driving the motor 5. When the drive motor 5 is running, on the other hand, the reference voltage is set to a second reference voltage Vt2 (7 V in the present embodiment) which is lower than the first reference voltage Vt1 by a predetermined amount and is needed to keep operating each relay 17a, 17b. At the time each relay 17a, 17b starts functioning, a relatively high voltage is required. Once each relay 17a, 17b starts functioning, however, the relay 17a, 17b can keep functioning even on a relatively low voltage. According to the present embodiment, therefore, the reference voltage that is used while the drive motor 5 is in operation is set to the second reference voltage Vt2 lower than the first reference voltage Vt1.

The control section 13 supplies the drive voltage +B to the drive motor 5 via a drive circuit 17 and controls the motor 5. The drive circuit 17 has the first relay 17a and the second relay 17b. Each relay 17a or 17b selectively supplies, and stops supplying the drive voltage +B to the drive motor 5 to thereby rotate the motor 5 forward and reversely or stops the motor 5.

Once the slide open switch SW2 is operated and an ON signal is input to the control section 13 from the switch SW2, the control section 13 performs the following operation without enabling an OFF signal even if sent from the switch SW2 thereafter. That is, once the control section 13 receives the ON signal from the switch SW2, the control section 13 switches on the first relay 17a to supply the drive voltage +B to the drive motor 5 and drives the motor 5. As a result, the roof glass 4 moves nonstop from the fully-closed position to the slide fully-open position, passing the tilt fully-open position, the pseudo fully-closed position and the flap-down position in order (automatic opening actuation). When the roof glass 4 is positioned in the slide fully-open position, the control section 13 stops supplying the drive voltage +B to the drive motor 5 to stop the actuation of the roof glass 4 by switching off the first relay 17a.

Once the slide close switch SW3 is operated and an ON signal is input to the control section 13 from the switch SW3, on the other hand, the control section 13 performs the following operation without enabling an OFF signal even if sent from the switch SW3 thereafter. That is, once the control section 13 receives the ON signal from the switch SW3, the control section 13 switches on the second relay 17b to supply the drive voltage +B to the drive motor 5 and drives the motor 5. Consequently, the roof glass 4 moves nonstop from the slide fully-open position to the fully-closed position in the opposite route to the route in the automatic opening actuation (automatic closing actuation). When the roof glass 4 is positioned in the fully-closed position, the control section 13 stops supplying the drive voltage +B to the drive motor 5 to stop the actuation of the roof glass 4 by switching off the second relay 17b.

When the slide open switch SW2 or the slide close switch SW3 is operated while the roof glass 4 is automatically operating, the control section 13 stops supplying the drive voltage +B to the drive motor 5 to stop actuating the roof glass 4, as mentioned above. When the slide open switch SW2 or the slide close switch SW3 is operated again, the control section 13 restarts supplying the drive voltage +B to the drive motor 5 to move the roof glass 4 from the current stopped position to the slide fully-open position or the fully-closed position.

While the tilt open switch SW4 is being operated, i.e., while receiving the ON signal from the switch SW4, the control section 13 switches on the first relay 17a and supplies the drive voltage +B to the drive motor 5 to drive the motor 5 in order to open the roof glass 4 in accordance with the ON signal (manual opening actuation). When the operation of the tilt open switch SW4 is stopped and an OFF signal is input to the control section 13 from the switch SW4, the control section 13 switches off the first relay 17a and stops supplying the drive voltage +B to the drive motor 5 to stop the drive motor 5 in order to stop the actuation of the roof glass 4. When the roof glass 4 is placed in the tilt fully-open position, the control section 13 stops supplying the drive voltage +B to the drive motor 5 to stop the actuation of the roof glass 4 even during the operation of the tilt open switch SW4.

While the tilt close switch SW5 is being operated, i.e., while receiving the ON signal from the switch SW5, the control section 13 switches on the second relay 17b and supplies the drive voltage +B to the drive motor 5 to drive the motor 5 in order to close the roof glass 4 in accordance with the ON signal (manual closing actuation). When the operation of the tilt close switch SW5 is stopped and an OFF signal is input to the control section 13 from the switch SW5, the control section 13 switches off the second relay 17b and stops supplying the drive voltage +B to the drive motor 5 to stop the drive motor 5 in order to stop the actuation of the roof glass 4. When the roof glass 4 is placed in the fully-closed position, the control section 13 stops supplying the drive voltage +B to the drive motor 5 to stop the actuation of the roof glass 4 even during the operation of the tilt close switch SW5.

First and second magnetic sensors 18a and 18b each comprised of a pair of Hall elements to detect the rotational speed (rotational period) and rotational direction of the drive motor 5 are provided on the circuit board of the control circuit 11. Specifically, a sensor magnet which has a plurality of S poles and N poles arranged alternately in the rotational direction of the rotary shaft (not shown) of the drive motor 5 are provided on the rotary shaft in such a way that the sensor magnet rotates together with the rotary shaft. The first and second magnetic sensors 18a and 18b are arranged near the sensor magnet at a predetermined interval in the rotational direction of the rotary shaft. That is, a non-contact type rotary sensor which detects magnetism is used in the present embodiment. When the drive motor 5 is rotated, each of the magnetic sensors 18a and 18b sends a pulse-like output signal to a detection circuit 19. The output signal from each magnetic sensor 18a, 18b has a predetermined differential phase. The detection circuit 19 shapes the waveform of each output signal and sends the shaped signal to the control section 13.

Based on the period of the output signal from each magnetic sensor 18a, 18b received via the detection circuit 19, the control section 13 detects the rotational period (or the rotational speed) of the drive motor 5.

When receiving an ON signal from the slide open switch SW2 or the tilt open switch SW4 as the result of the operation of that switch, the control section 13 increments the count number of the rotational period of the drive motor 5 by "1" for each period of the pulse-shaped output signal from each magnetic sensor 18a, 18b, for example, every time the output signal goes to a high level from a low level (see FIG. 2). On the other hand, when receiving an ON signal from the slide close switch SW3 or the tilt close switch SW5 as the result of the operation of that switch, the control section 13 decrements the count number incremented at the time of opening the roof glass 4 by "1" for each period of the pulse-shaped output signal from each magnetic sensor 18a, 18b. Then, the control section 13 detects the position of the roof glass 4 according to the count number.

As the count number becomes equal to or smaller than "10", as shown in FIG. 2, the roof glass 4 is regarded to be placed in the fully-closed position in the present embodiment. When the roof glass 4 is placed in the tilt fully-open position, the count number becomes "128" and when the roof glass 4 is placed in the pseudo fully-closed position, the count number becomes "205". When the roof glass 4 is placed in the flap-down position, the count number becomes "248" and when the roof glass 4 is placed in the slide fully-open position, the count number becomes "1062".

The area in which the count number ranges from "248" to "254" (equivalent to a slide A area shown in FIG. 2) is the area where a foreign-matter catching decision to be discussed later is not made or a reversed mask area. In the area in which the count number ranges from "254" to "1062" (equivalent to a slide B area shown in FIG. 2), a foreign-matter catching decision is made. When the roof glass 4 is placed in the mechanical limit position on the fully-open side, the count number becomes "1150". An initialization process which is needed to determine the correlation between the position of the roof glass 4 and the count number is carried out by operating the tilt close switch SW5 for at least a predetermined time or a predetermined number of times to move the roof glass 4, placed in, for example, the mechanical limit position on the fully-closed side, further in the closing direction and setting the count number to "0" in this state.

The control section 13 detects the rotational direction of the drive motor 5 in accordance with the phase difference between both pulse-shaped output signals and detects the moving direction of the roof glass 4, i.e., in which of the opening direction and the closing direction the roof glass 4 is moving, based on the detection of the rotational direction of the drive motor 5.

When the rotational speed of the drive motor 5 becomes slower than a predetermined decision value while the roof glass 4 is doing an automatic closing actuation as shown in FIG. 3, i.e., when the rotational period of the drive motor 5 becomes greater than a predetermined decision value, the control section 13 determines that a foreign matter is caught between the roof glass 4 and the roof panel 2. Then, the control section 13 rotates the drive motor 5 reversely to release the foreign matter caught in the closing roof glass 4 and moves the roof glass 4 in the opening direction by a predetermined count number (reverse actuation). At this time, the control section 13 switches the decrementing of the count number to incrementing based on the reverse rotation of the drive motor 5.

In a case where a foreign matter is caught, a load on the drive motor 5 increases, thereby increasing the current to the motor 5. This makes a drop in the value Vb of the drive voltage +B greater than that in the normal operation mode. According to the present embodiment, as described above, when the state in which the voltage value Vb is smaller than a predetermined reference voltage continues for a predetermined time t or longer, the voltage value Vb is regarded as abnormal and the drive motor 5 in operation is stopped. If the first reference voltage Vt1 is set as the reference voltage as indicated by the one-dot chain line in FIG. 3, regardless of whether the drive motor 5 is running, the control section 13 determines an abnormality in the voltage value Vb and stops the drive motor 5 in operation before detecting a foreign matter being caught. This phenomenon becomes prominent when the rigidity of the caught foreign matter is low.

According to the present embodiment, by way of contrast, the reference voltage is set to the second reference voltage Vt2 lower than the first reference voltage Vt1 while the drive motor 5 is running. Therefore, the control section 13 detects a caught foreign matter caught without determining an abnormality in the voltage value Vb and reverse the rotation of the drive motor 5 to reverse the moving direction of the roof glass 4. Even if the rigidity of the caught foreign matter is low, therefore, the present embodiment prevents a voltage abnormality from being judged before making a decision on a foreign matter being, and reliably detects a foreign matter being caught in the roof glass 4.

The control procedures the control section 13 executes will now be discussed with reference to flowcharts in FIGS. 5 to 8.

Figure 5:
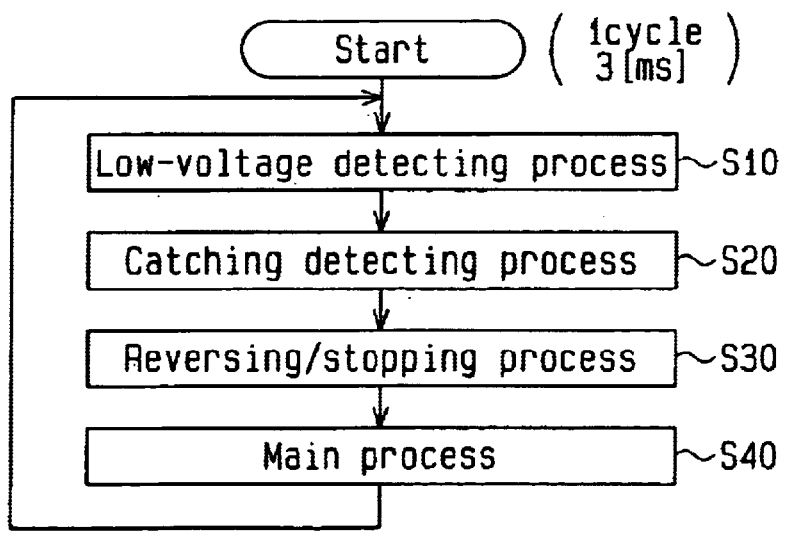
FIG. 5 is a flowchart illustrating a main process routine.

FIG. 5 illustrates a main process routine which is executed by the control section 13. The control section 13 executes this main process routine in response to an ON signal input from the ignition switch SW1.

The control section 13 performs a low voltage detecting process in step S10, a catching detecting process in step S20, a reversing/stopping process in step S30 and a main process in step S40, then returns to step S10. This main process routine is executed repeatedly every 3 ms.

Figure 6:
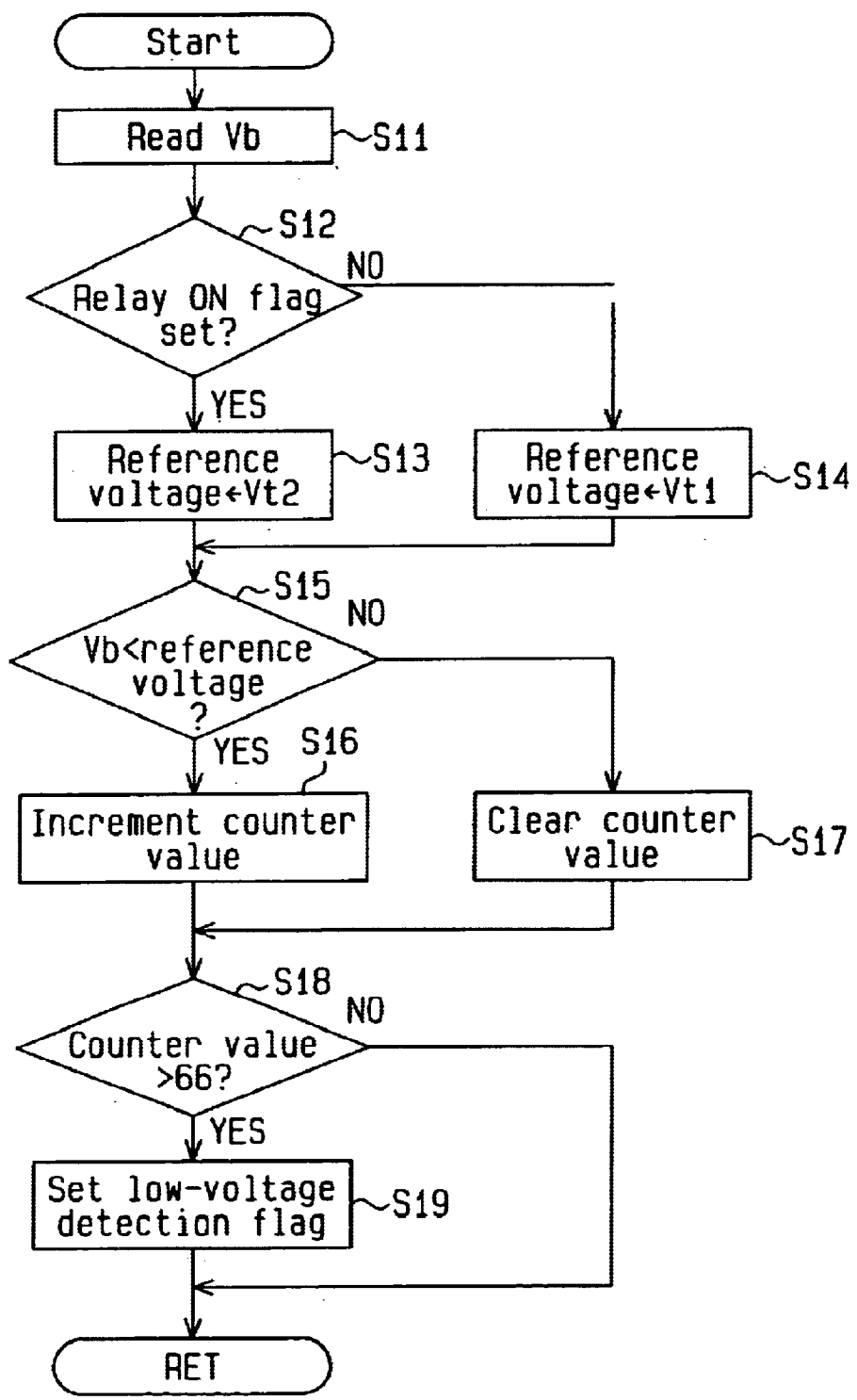
FIG. 6 is a flowchart illustrating a low-voltage detecting process.

The low-voltage detecting process in step S10 will be discussed below referring to the flowchart in FIG. 6. The control section 13 reads the voltage value Vb in step S11. In the next step S12, the control section 13 determines whether a relay-ON flag is set in order to detect the operational state of the drive motor 5. The relay-ON flag is set when either one of the first relay 17a and the second relay 17b is on, i.e., when the drive motor 5 is running. When the relay-ON flag is set, the control section 13 determines that the drive motor 5 is running and proceeds to step S13. In step S13, the control section 13 sets the reference voltage, which is used to determine an abnormality in the voltage value Vb, to the second reference voltage Vt2 (7 V in the present embodiment) and then proceeds to step S15.

When the relay-ON flag is reset in the step S12, on the other hand, the control section 13 determines that the drive motor 5 is stopped and proceeds to step S14. In step S14, the control section 13 sets the reference voltage, which is used to determine an abnormality in the voltage value Vb, to the first reference voltage Vt1 (8 V in the present embodiment) and then proceeds to step S15.

In step S15, the control section 13 determines whether the voltage value Vb read in the step S11 is smaller than the reference voltage set in the step S13 or step S14. The reference voltage is set to the first reference voltage Vt1 when the drive motor 5 is stopped, and is set to the second reference voltage Vt2 when the drive motor 5 is running. When the voltage value Vb is smaller than the reference voltage, the control section 13 decides that the voltage value Vb may be abnormal and proceeds to step S16. In step S16, the control section 13 increments the counter value and proceeds to step S18.

In step S18, the control section 13 determines whether the counter value has exceeded "66". As mentioned above, the main process routine in FIG. 5 including this low-voltage detecting process is executed repeatedly every 3 ms. Therefore, the counter value of "66" indicates that an abnormality in the voltage value Vb has been detected 66 times in a row, i.e., the state in which the voltage value Vb is lower than the reference voltage has continued for 198 ms (=3 ms×66) which is equivalent to the predetermined time t. When the counter value exceeds "66", therefore, the control section 13 decides that the voltage value Vb is abnormal and proceeds to step S19.

Power supply noise may cause the voltage value Vb to become less than the reference voltage. Because the state in which the voltage value Vb is lower than the reference voltage does not continue for 198 ms due to power supply noise, however, the influence of the power supply noise is eliminated in the process of step S18.

In step S19, the control section 13 sets a low-voltage detection flag which indicates that the voltage value Vb is abnormal and terminates the low-voltage detecting process. Thereafter, the control section 13 moves to the catching detecting process in step S20 in FIG. 5.

When the voltage value Vb is greater than the reference voltage in the step S15, on the other hand, the control section 13 decides that the voltage value Vb is normal and proceeds to step S17. In step S17, the control section 13 clears the counter value to zero and proceeds to step S18. In this case, it is naturally determined in step S18 that the counter value is smaller than "66", so that the control section 13 terminates the low-voltage detecting process and moves to the catching detecting process in step S20 in FIG. 5.

Figure 7:
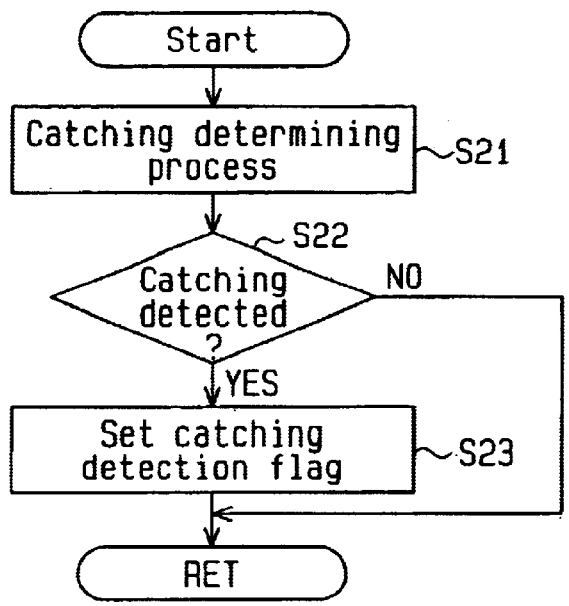
FIG. 7 is a flowchart illustrating a catching detecting process.

The catching detecting process in step S20 in FIG. 5 will be discussed below referring to the flowchart in FIG. 7. In step S21, the control section 13 executes a catching determining process. That is, the control section 13 detects the rotational speed (rotational period) of the drive motor 5 to determine whether a foreign matter is caught while the roof glass 4 is closing.

In step S22, the control section 13 determines whether a foreign matter being caught has been detected. Specifically, the control section 13 determines whether the rotational speed of the drive motor 5 has become slower than a predetermined decision value at the time of closing the roof glass 4. In other words, the control section 13 determines whether the rotational period of the drive motor 5 has become longer than the predetermined decision value. When the rotational speed of the drive motor 5 becomes slower than the predetermined decision value, the control section 13 determines that a foreign matter is caught between the roof glass 4 and the roof panel 2 and proceeds to step S23. In step S23, the control section 13 sets a catching detection flag and then terminates the catching detecting process. Then, the control section 13 moves to the reversing/stopping process in step S30 in FIG. 5.

When the rotational speed of the drive motor 5 becomes faster than the predetermined decision value in the step S22, on the other hand, the control section 13 determines that a foreign matter has not been caught, terminates the catching detecting process and moves to the reversing/stopping process in step S30 in FIG. 5.

Figure 8:
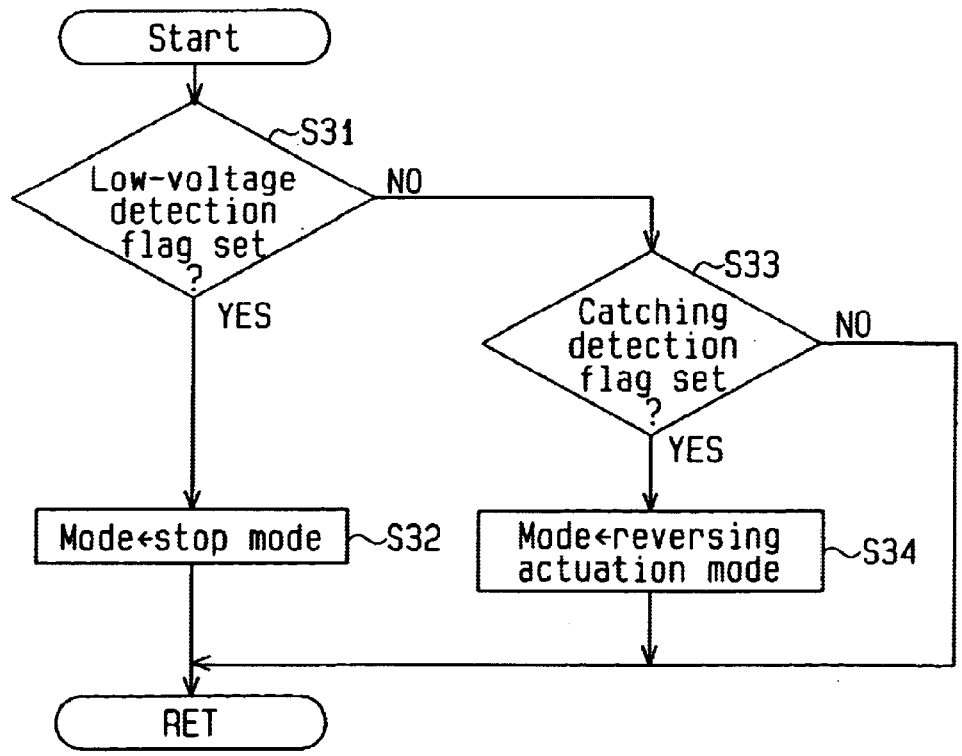
FIG. 8 is a flowchart illustrating a reversing/stopping process.

The reversing/stopping process in step S30 in FIG. 5 will now be discussed referring to the flowchart in FIG. 8. In step S31, the control section 13 determines whether the low-voltage detection flag is set. When the low-voltage detection flag is set, the control section 13 decides that the voltage value Vb is abnormal and proceeds to step S32.

In step S32, the control section 13 sets a stop mode and stops (inhibits) supplying the drive voltage +B to the drive motor 5. That is, the control section 13 stops the operation of the drive motor 5 if the drive motor 5 is currently running and inhibits the drive motor 5 from running if the drive motor 5 is currently stopped. Next, the control section 13 resets the low-voltage detection flag, then terminates the reversing/stopping process and goes to the main routine in step S40 in FIG. 5. In a case where the abnormality in the voltage value Vb continues, the low-voltage detection flag is set again in step S19 in FIG. 6 in the next process cycle. When the abnormality in the voltage value Vb continues, therefore, the state in which the drive motor 5 is stopped is maintained.

When the low-voltage detection flag is not set in the step S31, on the other hand, the control section 13 decides that the voltage value Vb is normal and proceeds to step S33.

In step S33, the control section 13 determines whether the catching detection flag is set. When the catching detection flag is set, the control section 13 decides that a foreign matter is caught between the roof glass 4 and the roof panel 2 and proceeds to step S34. In step S34, the control section 13 sets a reversing actuation mode. That is, the control section 13 rotates the drive motor 5 reversely to release the foreign matter caught in the roof glass 4 which is closing and shifts the roof glass 4 in the opening direction by a predetermined amount (predetermined count number). Then, the control section 13 terminates the reversing/stopping process, then moves to the main process in step S40 in FIG. 5. Note that after the movement of the roof glass 4 in the opening direction is completed, the control section 13 resets the catching detection flag.

When the catching detection flag is not set in step S33, on the other hand, the control section 13 decides that a foreign matter is not caught in the roof glass 4, terminates the reversing/stopping process, then moves to the main process in step S40 in FIG. 5.

In the main process in step S40 in FIG. 5, the control section 13 controls the drive motor 5 according to the manipulation of each of the switches SW2 to SW5, thereby controlling the movement of the roof glass 4.

The sunroof apparatus according to the present embodiment has the following advantages.

(1) In the present embodiment, an abnormality in the voltage value Vb is determined by comparing the voltage value Vb with the reference voltage. In this decision, the first reference voltage Vt1 is used as the reference voltage when the drive motor 5 is stopped, and the second reference voltage Vt2 lower than the first reference voltage Vt1 is used as the reference voltage when the drive motor 5 is running. Even when a drop in the voltage value Vb while the drive motor 5 is running, specifically, a drop in the voltage value Vb caused by a foreign matter having a low rigidity being caught between the roof glass 4 and the roof panel 2, occurs, a voltage abnormality is not determined before determining whether a foreign matter is caught. It is therefore possible to reliably detect if a foreign matter is caught and reverse the moving direction of the roof glass 4 according to the detection result.

(2) In the present embodiment, in a case where the state in which the voltage value Vb is lower than the reference voltage continues for the predetermined time t or longer, it is determined that the voltage value Vb is abnormal. Therefore, the influence of the power supply noise which instantaneously drops the voltage value Vb is eliminated and a decision on a voltage abnormality becomes accurate.

The embodiment of the present invention may be modified in the following manners.

In the embodiment described above, the first reference voltage Vt1 is compared with the voltage value Vb when the drive motor 5 is stopped, and the second reference voltage Vt2 is compared with the voltage value Vb when the drive motor 5 is in operation. It is however sufficient that the second reference voltage Vt2 be used at least at the time of closing the roof glass 4 where catching of a foreign matter may occur.

Although the first reference voltage Vt1 is set to 8 V and the second reference voltage Vt2 to 7 V in the embodiment, those values may be changed as needed.

In the embodiment described above, it is determined that catching of a foreign matter in the roof glass 4 has occurred when the rotational speed of the drive motor 5 becomes slower than the predetermined decision value. The decision on the catching of a foreign matter is not however limited to this particular method.

Although the magnetic sensors 18a and 18b each comprised of Hall elements are used for the rotary sensor in the embodiment described above, resistor elements whose resistances change in accordance with a change in magnetic field may be used. Besides those magnetic sensors, an optical rotary sensor may be used. Further, a contact type sensor which has slide contacts as well as a non-contact type sensor may be used as well.

Although the drive motor 25 and the control circuit 11 are constructed as a single drive unit 10 in the above embodiment, the drive motor 5 and the control circuit 11 may be provided separately.

Although the sunroof apparatus according to the embodiment described above performs both the slide operation and the tilt operation, the present invention may be adapted to a sunroof apparatus which performs only the slide operation.

The invention can be embodied into not only a sunroof apparatus which moves a roof glass as a moving member but also various other types of apparatuses, such as a power window apparatus which moves a window glass as a moving member and a slide door apparatus which moves a slide door as a moving member.

What is claimed is:

1. An apparatus for controlling a moving member movable between an opening position in which an opening of a frame is opened and a closing position in which said opening of said frame is closed, comprising:

a drive motor for actuating said moving member when applied with a drive voltage;

a switch which is operated to actuate said moving member; and a control section which controls supply of said drive voltage to said drive motor in accordance with an operation of said switch, wherein said control section rotates said drive motor reversely to reverse a moving direction of said moving member when movement of said moving member when obstructed by a foreign matter caught while said moving member is moving toward said closing position, wherein said control section determines that said drive voltage is abnormal when a state in which said drive voltage is lower than a predetermined reference voltage continues for a predetermined time or longer, and wherein said control section stops supplying said drive voltage to said drive motor to inhibit said drive motor from being operated when having determined an abnormality of said drive voltage, and wherein said control section sets said reference voltage to a selected one of a first value and a second value lower than said first value, and wherein said the control section sets said reference voltage to said second value at least while said moving member is moving toward said closing position.

2. The apparatus according to claim 1, wherein said control section sets said reference voltage to said first value when said drive motor is stopped and sets said reference voltage to said second value when said drive, motor is operated.

3. The apparatus according to claim 1, wherein said control section determines that said foreign matter is caught when a rotational speed of said drive motor becomes slower than a predetermined decision value while said moving member is moving toward said closing position.

4. An apparatus for controlling a moving member movable between an opening position in which an opening of a frame is opened and a closing position in which said opening of said frame is closed, the apparatus comprising:

a drive motor for actuating said moving member when applied with a drive voltage from a power supply;

a switch which is operated to actuate said moving member;

control means which controls supply of said drive voltage to said drive motor in accordance with an operation of said switch;

foreign-matter catching detection means for detecting that a foreign matter is caught between said moving member and an edge portion of said opening of said frame while said moving member is moving toward said closing position, whereby said control means rotates said drive motor reversely to reverse a moving direction of said moving member when catching of said foreign matter has been detected;

voltage detection means for detecting a value of said drive voltage;

abnormality determining means for determining that said drive voltage is abnormal when a state in which said detected value of said drive voltage is lower than a predetermined reference value continue for a predetermined time or longer, whereby said control means stops supplying said drive voltage to said drive motor to inhibit said drive motor from being operated when an abnormality of said drive voltage is determined;

state detection means for detecting an operational state of said drive motor; and changeover means for switching said reference value between a first value and a second value lower than said first value in accordance with said operational state of said drive motor in such away as to set said reference value to said first value when said drive motor is stopped and to set said reference value to said second value when said drive motor is operated.

5. The apparatus according to claim 4, wherein said foreign-matter catching detection means determines that said foreign matter is caught when a rotational speed of said drive motor becomes slower than a predetermined decision value while said moving member is moving toward said closing position.

6. An apparatus for controlling a moving member movable between an opening position in which an opening of a frame is opened and a closing position in which said opening of said frame is closed, comprising:

a drive motor for actuating said moving member when applied with a drive voltage from a power supply;

a switch which is operated to actuate said moving member;

control means which controls supply of said drive voltage to said drive motor in accordance with an operation of said switch;

foreign-matter catching detection means for detecting that a foreign matter is caught between said moving member and an edge portion of said opening of said frame while said moving member is moving toward said closing position, whereby said control means rotates said drive motor reversely to reverse a moving direction of said moving member when catching of said foreign matter has been detected;

voltage detection means for detecting a value of said drive voltage;

state detection means for detecting an operational state of said drive motor;

inhibition means for inhibiting said drive motor from being operated when said detected value of said drive voltage becomes lower than a first reference value at a time said drive motor is stopped; and stopping means for stopping said drive motor when a state in which said detected value of said drive voltage is lower than a second reference value smaller than said first reference value continues for a predetermined time or longer at a time said drive motor is operated, whereby said foreign-matter catching detection means performs a process of detecting catching of said foreign matter when said detected value of said drive voltage becomes greater than said second reference value.

7. The apparatus according to claim 6, wherein said foreign-matter catching detection means determines that said foreign matter is caught when a rotational speed of said drive motor becomes slower than a predetermined decision value while said moving member is moving toward said closing position.

8. A method of controlling a moving member movable between an opening position in which an opening of a frame is opened and a closing position in which said opening of said frame is closed, comprising the steps of:

causing said drive motor to actuate said moving member by applying a drive voltage to said drive motor;

rotating said drive motor reversely to reverse a moving direction of said moving member when movement of said moving member is obstructed by a caught foreign matter while said moving member is moving toward said closing position; determining that said drive voltage is abnormal when a state in which said drive voltage is lower than a predetermined reference voltage continues for a predetermined time or longer;

stopping supplying said drive voltage to said drive motor to inhibit said drive motor from being operated when an abnormality of said drive voltage has been determined; and setting said reference voltage to a selected one of a first value and a second value lower than said first value and setting said reference voltage to said second value at least while said moving member is moving toward said closing position.

9. The method according to claim 8, wherein said reference voltage is set to said first value when said drive motor is stopped and is set to said second value when said drive motor is operated.

10. The method according to claim 8, wherein it is determined that said foreign matter is caught when a rotational speed of said drive motor becomes slower than a predetermined decision value while said moving member is moving toward said closing position.

11. A method of controlling a moving member movable between an opening position in which an opening of a frame is opened and a closing position in which said opening of said frame is closed, comprising the steps of:

causing said drive motor to actuate said moving member by applying a drive voltage to said drive motor;

detecting that a foreign matter is caught between said moving member and an edge portion of said opening of said frame while said moving member is moving toward said closing position, whereby rotating said drive motor reversely to reverse a moving direction of said moving member when catching of said foreign matter has been detected;

detecting a value of said drive voltage;

detecting an operational state of said drive motor;

inhibiting said drive motor from being operated when said detected value of said drive voltage becomes lower than a first reference value at a time said drive motor is stopped; and stopping said drive motor when a state in which said detected value of said drive voltage is lower than a second reference value smaller than said first reference value continues for a predetermined time or longer at a time said drive motor is operated, whereby performing a process of detecting catching of said foreign matter when said detected value of said drive voltage becomes greater than said second reference value.

* * * * *

UNITED STATES PATENT AND TRADEMARK OFFICE
CERTIFICATE OF CORRECTION

| | | |
|---|---|---|
| PATENT NO. | : 6,713,980 B2 | Page 1 of 1 |
| APPLICATION NO. | : 10/208689 | |
| DATED | : March 30, 2004 | |
| INVENTOR(S) | : Mukai et al. | |

It is certified that error appears in the above-identified patent and that said Letters Patent is hereby corrected as shown below:

Please correct the following typographical errors in the Claims as follows:

Col. 11, Claim No. 1, Line 19:

delete "wherein said the" and insert -- wherein said --

Col. 11, Claim No. 2, Line 26:

delete "drive," and insert -- drive --

Col. 12, Claim No. 4, Line 2:

delete "away" and insert -- a way --

Signed and Sealed this

Eighth Day of January, 2008

JON W. DUDAS
*Director of the United States Patent and Trademark Office*